INVENTOR.
Wells A. Webb
BY
Townsend and Townsend
attorneys

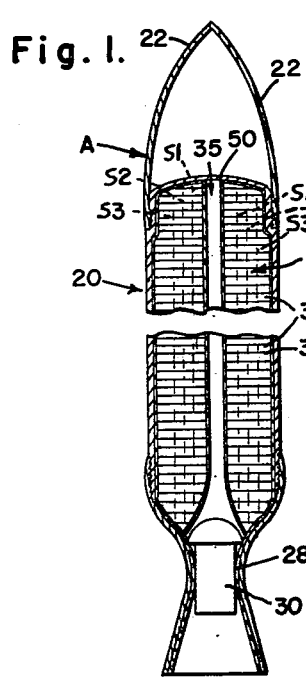
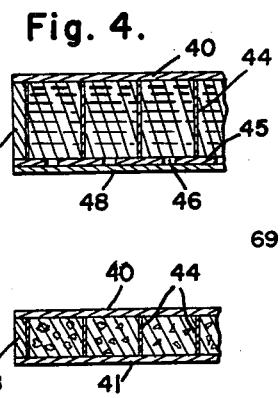
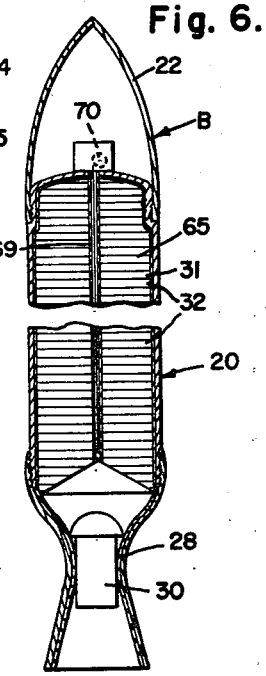
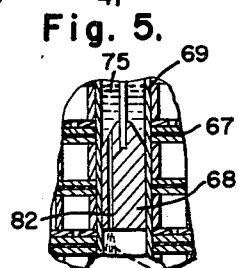
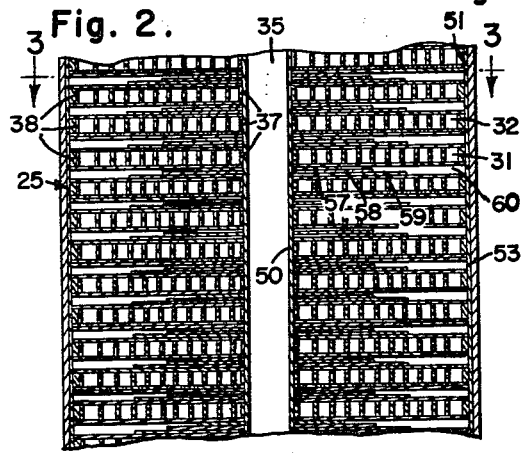
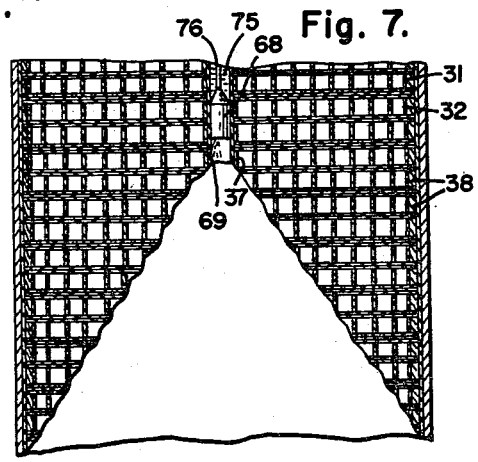
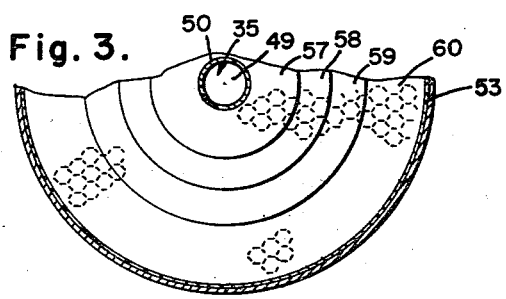
INVENTOR
Wells A. Webb INVENTOR
Wells A. Webb April 28, 1964     W. A. WEBB     3,130,672
ROCKET GRAIN CONSTRUCTION Filed April 7, 1959                   3 Sheets-Sheet 3

United States Patent Office

3,130,672
Patented Apr. 28, 1964

3,130,672
ROCKET GRAIN CONSTRUCTION
Wells A. Webb, Berkeley, Calif., assignor to Hexcel Products Inc., Berkeley, Calif., a corporation of California
Filed Apr. 7, 1959, Ser. No. 804,847
3 Claims. (Cl. 102—98)

This invention relates to the structure of expendable rocket grains and the method of manufacturing the same.

This invention is an improvement of the Structural Rocket Grain and Method of Rocket Engine Construction described in my copending United States patent application Serial No. 728,432, filed April 14, 1958, now abandoned. As described in the aforesaid patent application a cellular material such as honeycomb may be employed in the interior of a rocket to encase oxidant and fuel and to provide in the rocket a structural support which is burned with the fuel. Thus as the fuel is expended there is combustion of the supporting members of the rocket. By means of using the burnable honeycomb or cellular area support for the fuel and oxidant the maximum structural strength is available during the initial burning phase while still allowing the rocket to lighten its structural weight load by the burning of the structural members during burn-out.

The principal object of this invention is to provide an improvement of the cellular grain by a novel arrangement of separated fuel and oxidant carrying cellular or honeycomb sandwiches to provide a mechanical separation between the oxidant and the fuel which breaks down only under extreme temperatures to allow for the mixture and subsequent burning of the burning agent.

A feature and advantage of this invention is that the fuel is normally separated from the oxidant so that the danger of accidental combustion is substantially reduced. The device, however, may be readily ignited by raising the temperature of the structure to a high enough range to cause a mechanical breakdown of the structure to allow the two ingredients to mix and burn.

Another principal object of this invention is to provide a grain structure with means to create initial burning on an axial longitudinal center line and having means to cause the burning of the grain to be in a conical configuration with the apex of the burning area being on the center line and the peripheral edges of the area being rearwardly on the edge of the grain structure.

Another feature and advantage of this invention is that the burning in an inverted conical configuration allows for a more efficient burning discharge at a controlled rate so that there is an even, controlled acceleration of the rocket throughout its entire burning cycle rather than having an uneven burning for the beginning or other stage of burning as occurs in many grain structures.

Another object of this invention is to provide means for adjustably controlling the burning of the grain from the center outwardly by the provision of heat transfer rings which causes heat to be conducted at different rates to different areas of the unburned fuel and oxidant.

A further object of this invention is to provide a device to control the rate of grain burning employing a moving plug which is timed to longitudinally forwardly move with respect to the grain structure to regulate the burning of the grain.

A feature and advantage of the movable plug is that the plug functions as a burning inhibitor so that the burning of the grain does not occur beyond the plug thereby allowing the burning to be regulated in accordance with the rate of withdrawal or movement of the plug.

A still further object of this invention is to provide a novel grain structure employing sandwiches formed of cellular or honeycomb material encasing an oxidant and/or fuel within the sandwich structure.

A feature and advantage of the sandwich cellular structure is that the sandwiches may contain either a solid or a liquid propellant fuel or oxidant.

Another feature and advantage of the sandwich structure is that the sandwiches may be placed in alternate layers within the rocket structure so that one sandwich layer contains a fuel while the other sandwich layer contains an oxidant thus mechanically separating the fuel from the oxidant until the temperature for the sandwiches is great enough to mechanically break down the sandwich feature.

A still further feature and advantage of the sandwich structure of this invention is that various types of fuels may be employed alternately or in repetitive layers within the rocket grain structure in such a manner as to regulate the thrust of the rocket for different burning phases in accordance with the fuel properties within the sandwich structure during the particular burning phase.

Still a further object of this invention is to provide a novel means of filling honeycomb or cellular sandwiches with a liquid propellant employing the steps of covering the cellular or honeycomb structure with a skin in which one face of the skin is provided with small apertures, each aperture being coincident with a cellular area. Thereafter the sandwich structure is inserted within a tank where it is evacuated and while in the low pressure condition is subjected to an environment of liquid fuel or oxidizer under sufficient pressure to force the propellant or oxidizer to enter through the small aperture to solidly pack the cellular area.

A feature and advantage of the novel method of filling the cellular core structure is that the material filling the cell is completely solid without air pockets so as to provide an effective solid non-compressible mass for withstanding the pressure created against the grain by the burning of the rear end of the grain of the rocket.

A further feature and advantage of this invention is that the sandwich structures carrying the oxidant and the sandwich structures carrying the fuel may be stored at separate places prior to their installation within a rocket to form a grain thus substantially reducing the storage hazards of the burning materials.

A still further object of this invention is to provide a novel mechanism and method of assembling a rocket with sandwich structures by the provision of filling the rocket casing with a liquid adhesive and then inserting layers of sandwich structures within the casing so that each sandwich structure is submerged within a liquid glue or adhesive at the time of installation within the casing.

Still a further object of this invention is to provide a novel rocket grain structure having cellular areas filled with oxidants and fuels mechanically separated from one another in which the oxidant, fuel and the separating agents and the areas between same are all formed of substantially non-compressive materials so that the thrust generated from the burning of the fuel does not react to cause a collapse or break down of the grain structure.

Other objects of the present invention will become apparent upon reading the following specification and referring to the accompanying drawings in which similar characters of reference represent corresponding parts in each of the several views.

In the drawings:

FIG. 1 is a sectional view of a rocket employing the grain structure of this invention which uses heat transfer or conducting rings to regulate the burning of the grain.

FIG. 2 is a fragmentary enlarged view of FIG. 1.

FIG. 3 is a cross-section of FIG. 2 taken at line 3—3.

FIG. 4 is a greatly enlarged view of a honeycomb or cellular structure adapted for use with a liquid propellant or oxidant.

FIG. 5 is a greatly enlarged view of a sandwich structure adapted for use with a solid oxidant or fuel.

FIG. 6 is a modification of the rocket grain structure shown in FIG. 1 employing a movable plug to control the burning of the grain.

FIG. 7 is an enlarged fragmentary view of the embodiment of FIG. 6.

FIG. 8 is a still further enlarged view of the plug mechanism used in the embodiments of FIGS. 6 and 7.

Figure 9:
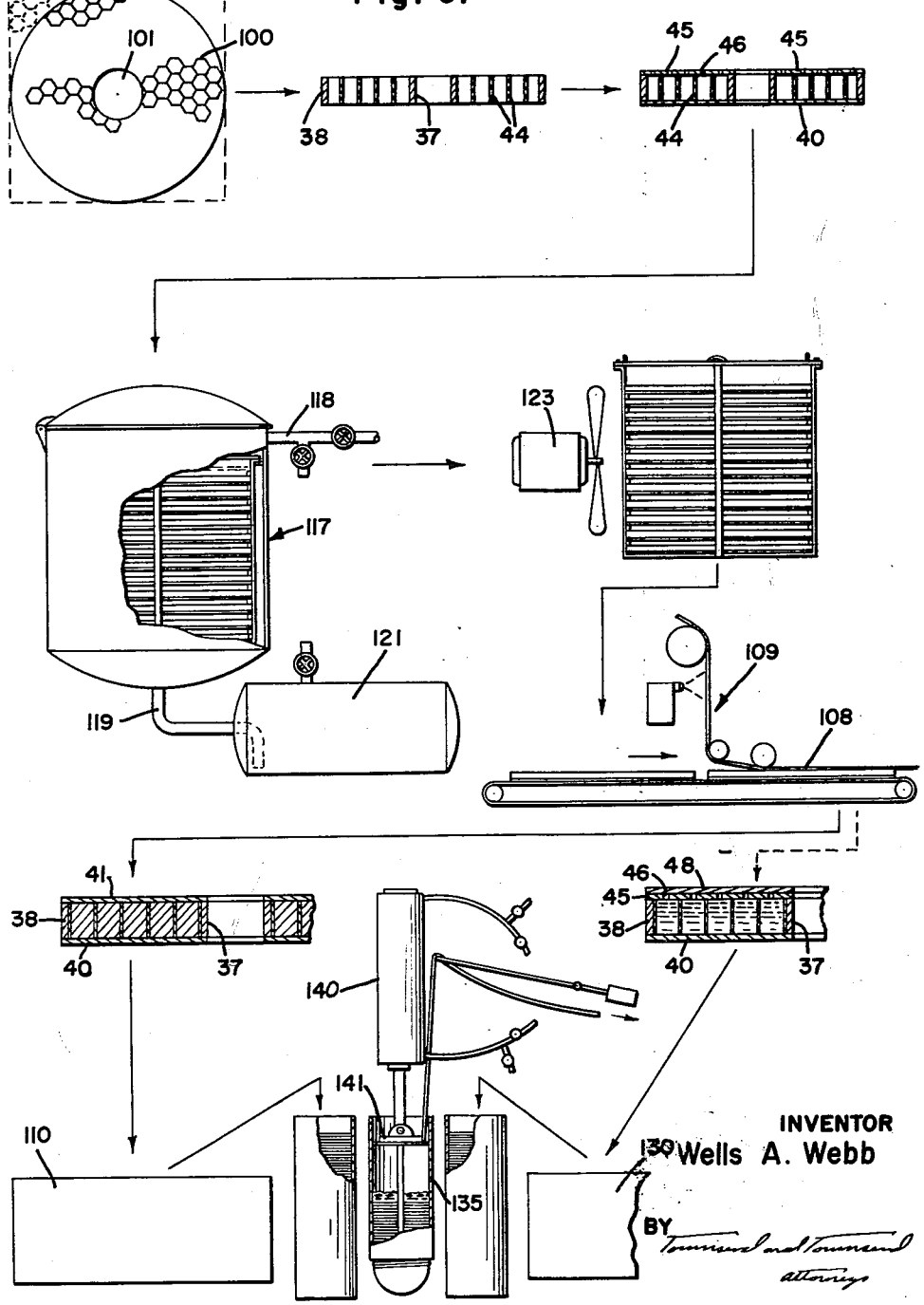
FIG. 9 is a schematic view showing the novel process for forming and filling the grain sandwich structure and for assembling the sandwich structures within a rocket casing to construct a rocket grain.

Referring now to the drawings and with particular reference to FIGS. 1, 2 and 3 there is provided a rocket A having a case or casing 20 on the front portion of which is mounted a head or warhead 22 which may be used for carrying guidance equipment or explosives.

To the rear of the warhead and interior of the casing is the grain 25. The body of the casing is provided on the rear end with an exhaust throat 28 of reduced diameter through which the exhaust gases from the burning grain 25 are emitted.

Throat 28 is normally covered by a squib 30 which carries a pyrotechnic charge which may be electrically ignited in such a manner as to kindle or fuse the burning of grain 25.

Grain 25 is formed of stacked layers of oxidant carrying sandwiches 31 and fuel or propellant carrying sandwiches 32. An ignition tube 35 extends axially rearwardly from head 22 through sandwiches 31 and 32 opening at the rear facing squib 30.

Sandwiches 31 or 32 may contain a liquid propellant in a structure such as indicated in FIG. 4 or a solid propellant as indicated in FIG. 5. The cellular structure forming the sandwich may be honeycomb which may be in a hexagonal form or in other configurations such as square or even randomly shaped cellular areas.

The ends of the honeycomb core are covered by a first face or skin 40 and the opposite face, in the embodiment of FIG. 5 which carries the solid propellant or oxidant, is covered by a similar skin 41. The end walls of the honeycomb are shown at 44.

The sandwich type as shown in FIG. 4, which is adapted particularly for liquid propellant or oxidant, is also provided with a first skin 40 and on the opposite face there is a skin 45 carrying small apertures 46 through which the liquid filler material may be injected into the cells. At least one of the apertures is aligned with each cellular area for this purpose. Over the skin 45 is a covering skin 48 which completely seals the apertures to encase the liquid filler within the cellular area of the sandwich. It is important that the solid material such as shown in FIG. 5 or the liquid material shown in FIG. 4 is sufficiently exhausted of all air or gas particles so that the entire cellular area is substantially noncompressive. The manner of filling the cellular area with filler will hereinafter be more specifically described.

The material forming the sandwich should be of a material which disintegrates or burns within the time limit of the burning of the fuel. This means that the gage of the material, if metal, must be small enough to allow metal to rise to the burning temperature along with the burning fuel. Cores for the sandwiches 31 and 32 are cylindrical slices as indicated in FIG. 3. Each of the sandwiches is formed with an interior hole formed to receive a wall insert 50 which forms ignition tube 35. The edges of the core are sealed by an inner ring 37 and an outer ring 38.

The grain is constructed by stacking alternately oxidant sandwiches 31 on fuel sandwiches 32 within the casing 20 of rocket A. The stacked sandwiches are aligned so the holes 49 are in axial alignment to receive insert 50. A sealer 53 seals the outer rim of each sandwich against casing 20.

In operation ignition tube 35 is filled with a pyrotechnic material so that when squib 30 is ignited the temperature within the grain opposite the squib and ignition tube 35 is elevated sufficiently to fire the pyrotechnic. The heat of the tube causes a break-down of the physical structure of the sandwich structure opposite the tube thus releasing and turning into gas the oxidant and fuel under conditions of sufficient temperature to cause the ignition and burning of the fuel. The conditioned burning of the fuel is directed from the ignition tube outwardly towards the rim of the casing of the rocket.

The alternation of the layers of oxidant and fuel keep the two ingredients separated until the structural portion of the sandwich is sufficiently broken down by the elevated temperature to cause the release of the two substances in gas form ready for burning.

It is highly desirable to control the burning of the rocket so that the burning occurs at a controlled rate from the center outwardly in a form similar to that illustrated in FIG. 1 of the drawings. Progressive stages of outward radial burning of the grain are indicated in broken lines at S–1, S–2, and S–3 in FIG. 1.

To effectuate the burning control coaxial heat transfer rings are provided between the honeycomb sandwiches. The rings are designated as at 57, 58 and 59. The three rings 57, 58 and 59 are stacked one on top of the other between the juxtaposed faces of adjacent sandwiches. Each of the rings 57, 58 and 59 are of progressively increasing diameter. Ring 57 is smallest, ring 58 is larger and ring 59 is largest. Each of the rings is formed of a metallic substance highly conductive to heat such as copper or aluminum.

The area indicated at 60 which is not occupied by rings 57, 58 and 59 is filled by a low heat conductive material such as polyurethane. In addition the space between the outer rim 51 of each of the sandwiches and the inner wall of the casing is filled by a low heat conductive solid resinous adhesive such as polyurethane indicated at 53.

As can be seen in FIG. 1 when squib 30 is ignited the heat first attacks the cellular area immediately adjacent the ignition tube 35 and causes the aluminum forming the honeycomb core and the skin for the core to burn thus releasing the contents of the cellular area for combustion.

At the same time heat transfer rings 57, 58 and 59 freely conduct and accelerate radial outward transfer of heat generated by the burning grain. The maximum rate of heat transfer is from the ignition tube to the edge of transfer ring 57 to which point heat is conducted through all three of the metal conductors 57, 58 and 59. A slower heat transfer occurs to the edge of ring 58 during which heat is transferred through two metal conductors 58 and 57. A still slower rate of heat transfer occurs between the edge of ring 58 to the outer rim of element 59 when heat is transferred through the single metal conductor 59. Minimum heat transfer occurs in the remaining area at 60 between the edge of ring 59 and the wall of the casing of the rocket where no heat accelerating metal conductors are provided.

By means of heat transfer rings the burning is encouraged to travel outwardly from the ignition tube in progressively decreasing stages toward the peripheral edge or outer rim of the casing. Sealer 53 prevents fluid communication of gas at the peripheral rim of the grain and prevents burning at the rim.

This structure thus creates a four stage burning pattern as shown in FIG. 1 in which heat transfer by the ring allows a more even distribution and control of the burning within the rocket grain.

In FIGS. 6 and 7 there is provided another embodiment of the invention including a rocket B constructed similar to rocket A, i.e., having a case 20, a nose cone or warhead 22, a throat 28 with a pyrotechnic charged squib 30. Grain 65 is located between the throat and the warhead 22. Grain 65 is constructed by placing alternate layers of honeycomb material, such as shown in FIGS. 4 and/or 5, in alternate layers of oxidant and fuel as indicated at 31 and 32.

The control of the burning is arranged to effect a substantial conical burning configuration within the rocket by a movable inhibitor or piston 68 which is arranged to be slidably pulled down the length of the ignition tube 69 by a pulling mechanism 70.

The sandwich structures forming the sandwiches 31 and 32 are immediately abutted next to each other and need not employ the heat transfer rings as shown in rocket A.

Each of the sandwiches 31 and 32 in rocket B may be juxtaposed relative to one another with a layer of low heat conductive material 67 between adjacent skins in a manner as will be hereinafter described in the process described in FIG. 9.

Piston 68 is arranged to move down the ignition tube 69 by mechanism 70 via a cable 76 which is pulled by a timer in mechanism 70 at a regulated rate. Tube 69 is filled with a liquid fuel 75 such as kerosene to provide back pressure to equalize the thrust pressure caused by the burning of the grain within rocket B. Release of the fluid forwardly of piston 68 is occasioned by a small aperture 82 formed longitudinally within the piston to allow gradual release of the burnable fluid within the column or ignition tube 69 as the piston is drawn towards the front of the rocket. The spray of fluid fuel adds to the conflagration adjacent the rear face of the piston.

In operation of rocket B when squib 30 is fired the rocket grain immediately adjacent the ignition tube is caused to burn.

Piston 68 prevents the burning of the sandwich structure beyond the top surface of the piston. This is due to the nature of burning from the center of the sandwich outwardly. It is noted that the break down of the cellular structure forming the sandwiches occurs first in the cellular walls 44 thus creating an inward break down rather than a forward or longitudinal break down through the skin of the sandwich structure. The results of this type of burning control mechanism provides for control burning at the center section with the remaining free burning being in the region of the center outwardly towards the peripheral edge of the rocket grain structure. This creates a conical burned area and gives a substantially even and controlled burning thrust to the rocket.

Each of the sandwiches 31 and 32 in rocket B may be juxtaposed relative to one another with a layer of low heat conductive material 67 between adjacent skins in a manner as will be hereinafter described in the process described in FIG. 9.

Piston 68 is arranged to move down the ignition tube 69 by mechanism 70 via a cable 76 which is pulled by a timer in mechanism 70 at a regulated rate. Tube 69 is filled with a liquid fuel 75 such as kerosene to provide back pressure to equalize the thrust pressure caused by the burning of the grain within rocket B. Release of the fluid forwardly of piston 68 is occasioned by a small aperture 82 formed longitudinally within the piston to allow gradual release of the burnable fluid within the column or ignition tube 69 as the piston is drawn towards the front of the rocket. The spray of fluid fuel adds to the conflagration adjacent the rear face of the piston.

In operation of rocket B when squib 30 is fired the rocket grain immediately adjacent the ignition tube is caused to burn.

Piston 68 will inhibit propagation of flame through the ignition tube and thus may be used to control the rate of flame propagation through the grain. More specifically, once grain 32 is ignittd, burning will occur progressively from the combustion chamber toward the upper end or nose of the rocket at a given rate regardless of whether the piston 68 is withdrawn through the ignition tube or not. As above indicated, the honeycomb sandwich which encapsulates the fuel oxidant mixture is, itself, consumable under the heat generated in the combustion chamber, and, depending on the temperatures generated in the chamber, so also would the piston, itself, and the walls lining the ignition tube be consumable at a definite rate under influence of the heat generated during the burning process.

Therefore, although the inclusion in the rocket grain of a piston arrangement of the type referred to may not be used to either stop burning of the grain once it is ignited or to control the minimum rate of burning of the grain, the withdrawal of the piston through the ignition tube at a controlled faster rate than the minimum flame propagation through the grain may serve to accelerate the rate of flame propagation through the grain via the ignition tube, and to this extent provides a means for controlling the rate of burning through the grain.

The manner of the assembly of the rocket is schematically illustrated in FIG. 9 wherein a block of honeycomb indicated at 100 is first cut into tubular slices and the center area of each slice is removed as indicated at 101 so as to provide a slice of honeycomb core material with a center cutout and a coaxial outer rim.

A solid ring 38 is placed around the outer rim of the sandwich core material and a similar inner ring 37 is placed on the interior edge forming the central cutout 101. Thereafter a first skin 40 is glued with a suitable compatible resin or cement to the bottom of the core. The core with the bottom face attached may then be filled with a solid fuel or oxidant filler by simply pouring the filler into the cellular area while in a fluid or plastic state and then conditioning the material to set up as a solid.

After the filler material within the core has solidified, a top skin 41 is attached to the top face of the material by a facing machine as indicated generally at 109. The top face is permanently attached to the core by a suitable cement or glue. The resulting sandwich product is then stored in a storage area as indicated at 110 until the sandwich is to be assembled to form a rocket grain.

If a liquid material is to be filled within the cellular core structure, then after the bottom face has been attached to the core, a top face 45 is attached to the core over empty cells. The top face 45 is provided with a plurality of small apertures 46. Each of the apertures 46 is aligned with one of the cells.

The empty honeycomb core sandwich is then placed within a chamber 117. Chamber 117 is then evacuated through pipes 118 so that the pressure within tank 117 and within the cellular areas of the sandwich is substantially below atmospheric pressure. Under these conditions a liquid oxidant or propellant is fed through line 119 to a storage tank 121. The sandwiches are removed from tank 117 and are externally dried as under influence of a blower 123 or by wiping, or otherwise. After being externally dried, the sandwiches are then fed through machine 109 which applies a face skin 48 on top of the face 45 to completely seal all the apertures 46.

It should be appreciated that the above described method constitutes only one way of filling a honeycomb sandwich with a liquid filler, and that other methods and techniques for filling the honeycomb cells may be used or developed according to the particular types of filler materials employed and other local conditions without placing any limitation on the scope of invention as claimed herein.

It is preferable that the sandwiches containing the fuel be separated physically a considerable distance from the sandwiches containing the oxidant. Both of the sandwiches while separated are safer to handle in that the elements necessary for rapid chemical activity are not combined.

To assemble the rocket grains, a rocket casing such as indicated at 135 is filled with a liquid glue or plastic resin such as polyurethane. The sandwiches containing the fuel and oxidant are alternately placed within casing 135 by a pneumatic ram mechanism 140. The ram mechanism comprises a platform 141 which is arranged to reciprocally vertically move into and out of the casing. The sandwiches are held against platform 141 by air pressure which forms a vacuum to hold the sandwiches against the plate. There is always sufficient liquid adhesive within casing 135 so that the next added sandwich is completely submerged under adhesive. By this means it is insured that all the spaces between the sandwiches will be filled by a solid non-compressible material. Thus, the final grain structure comprising the individual sandwiches, each filled with a substantially non-compressive material (liquid or solid), plus the solid filler or adhesive materials such as polyurethane solidly filling all voids between the sandwiches, establishes a rigid and substantially non-compressive grain structure capable of resisting high compressional forces without collapsing, forming fissures or otherwise losing its structural integrity. This structural feature of the grain also contributes to the stiffness and strength to the rocket as a mechanical unit during handling, firing and flight.

Figure 10:
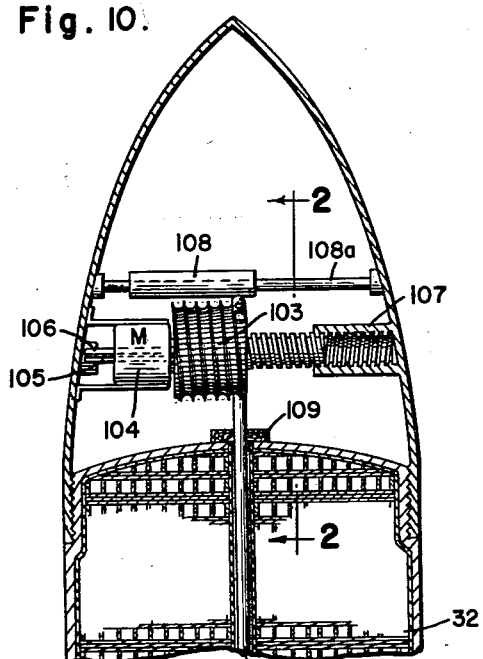
FIG. 10 is a longitudinal sectional view showing a further modification of a rocket grain structure.
Figure 11:
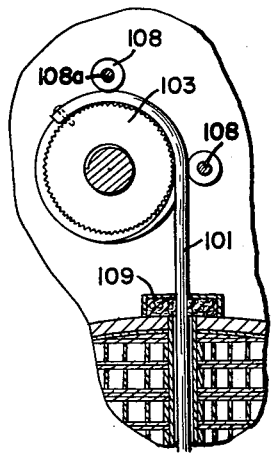
FIG. 11 is an enlarged fragmentary sectional view taken substantially on line 2—2 of FIG. 10.
Figure 12:
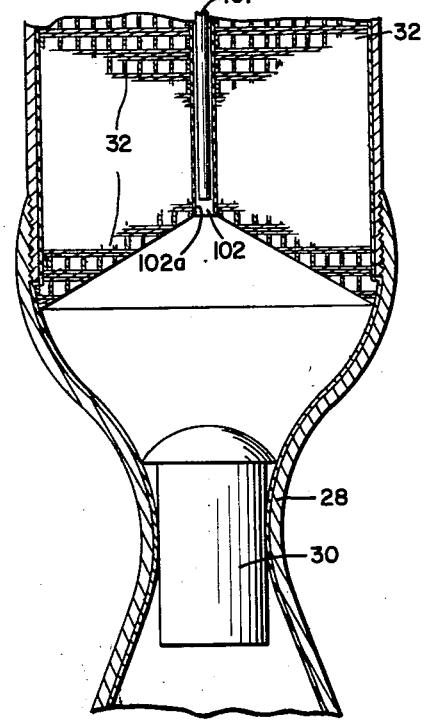
FIG. 12 is a fragmentary side elevational view of the winch mechanism shown in a second condition of operation.

Referring specifically to FIGS. 10 and 11, there is illustrated a further embodiment of the invention, particularly designed for rocket engines of the type that utilize a propellant which may generate very high internal temperatures in the range of 5,000° C. (9,000° F.) and above. The embodiment shown in FIG. 10 is similar to the embodiment described hereinabove with specific reference to FIGS. 6, 7 and 8 in that the burning of the propellant is controlled by a movable piston type unit which is slidably mounted within an axially disposed ignition tube. However, when considering temperatures in the range of 5,000° C., there is no material known to me from which a piston head could be made that would not be consumed by heat. Consequently, the embodiment of FIG. 10 contemplates the use of the solid flexible cable or "piston" 101 of uniform diameter or cross-section throughout its length, and which is mounted slidably within an ignition tube 102 which extends lengthwise through the honeycomb sandwich encapsulated propellant 32. The cable type piston 101 is made from a flexible plastic heat ablative material which, comparatively speaking, has a low rate of heat transfer and a slower burning rate than the rocket propellant. Nitrocellulose suggests itself as a possibility for this application of use. The walls of the ignition tube 102 are likewise lined with a similar material, whereby both the cable piston 101 and the walls 102a might be expected to consume or burn away (endwise) at the same rate, assuming no movement or withdrawal of the piston with the tube.

The upper end of the cable piston 101 is anchored to a helically grooved winch drum 103. As schematically illustrated, the drum 103 may be rotated at a controlled speed by a suitable motor unit 104 which is non-rotatably, although longitudinally slidably keyed as at 105, to the drive shaft 106 formed as an integral extension of winch 103. The opposite end of drive shaft 106 is threadedly rotatably supported in a bearing 107. Consequently rotation of the winch drum 103 in a direction appropriate to cause the cable piston 101 to wind itself within the helical grooves 103 will also (by virtue of the threaded connection between shaft 106 and bearing 107) cause the entire winch to move to the right as shown in FIG. 10 and thereby maintain the point of winding of the cable on the drum maintained in axial alignment with the ignition tube 101.

In order to maintain a positive gripping engagement between the cable 101 and the winch drum 103, the helical grooves of the drum may be provided with relatively sharp teeth capable of embedding themselves into the body of the cable under influence of one or more pressure rollers 108 mounted adjacent the winch in pressure biasing contact against the outer perimeter of the cable being wound thereon. The purpose of maintaining a mechanical interlock between the winch and the cable is to minimize or preclude the possibility of the cable piston being extruded or forced out the ignition tube under influence of the high pressures generated within the combustion chamber of the rocket engine.

In order to minimize or preclude the flame from the combustion chamber passing between the piston cable 101 and the lining 102a of the ignition tube, a viscous lubricant may be packed between the cable and the walls of the ignition tube and thereby solidly fill any space or clearance that otherwise might exist between the cable and the tube, and which might permit passage of the flame therebetween. To prevent extrusion of the lubricant through the upper end of the engine, a suitable packing gland 109 is shown schematically in the upper part of the rocket casing.

In operation, the piston cable may be slidably withdrawn through the ignition tube by a suitable speed control mechanism (not shown) which governs the speed of winding of the winch drum. By withdrawing the piston cable at a controlled speed (faster than the minimum rate of flame propagation through the encapsulated grain), the rate of burning of the grain as determined by the rate at which the flame propagates through the grain via the ignition tube, can be accelerated at a controlled rate.

The oxidant and the fuel have been described as being in alternate layers. However, it is to be understood that the system of this invention may be useful in employing several oxidant carrying layers with each fuel layer or several fuel layers for each oxidant carrying layer. It is also believed readily apparent that different fuels could be combined in mechanically separated forms in the same manner. It is also believed further apparent that while the principal embodiments have been shown in substantially round cross-section that other cross-sections such as hexagonal, square and the like may be employed without departing in any way from the scope of the invention.

It is understood that to make the most efficient rocket embodying the present invention, the honeycomb and other sheet material from which the sandwich units are made and the filler materials are selected from a class of materials that will burn with the oxidant thereby contributing to the specific impulse of the rocket and eliminating inclusion in the grain of any dead weight, i.e., materials that do not contribute to the specific impulse. In general, aluminum, magnesium and other metallic alloys of thin gauge are suitable for this purpose.

Finally, it is believed that a better regulated control of burning can be obtained when using oxidant and fuel substances of either high viscosity or solid state whereby as each honeycomb cell is ruptured under influence of heat, the contents there of will not immediately spill out and subject the next cell to rupturing heat. Stated otherwise, it may be anticipated that in using granular substances or liquids of low viscosity, as each cell is ruptured, the contents will spill out subjecting the cell behind it to rupturing heat before the contents of the first cell will have been consumed. Such conditions may lead to excessively rapid or uncontrolled burning rates. Therefore, I propose that when using liquid or granular fuels or oxidants where the above problem may be encountered, that a suitable gelling agent, dispersant, or binder matrix be added to render the substance semi-solid or highly viscous whereby the fuel or oxidant will burn in place and not spill out immediately upon rupturing of the cell. By way of example, a fuel, such as polyurethane, may be used as a matrix binder for a granular oxidant, such as lithium perchlorate, dispersed and held in solid suspension within said matrix. Liquid fuels, such as hydrazine, ethylene diamine, and/or a fuel mixture of diethylene triamine (80%) and methylamine (20%) may be gelled to gelatin or semi-solid states by addition of appropriate quantities of carboxyl vinyl polymer. Liquid oxidizers, such as bromine pentafluoride might be gelled by the addition of a fluoro carbon polymer, whereas, an oxidizer, such as hydrogen peroxide might be gelled with a carboxyl vinyl polymer.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. In a rocket grain structure the combination of: a plurality of individual structurally integral sandwich members stacked one upon the other to form a composite rocket grain structure; each sandwich member comprising a sheet of honeycomb cellular material having cellular openings at the two broad faces of the sheet; first and second substantially flat skins covering the two broad faces of said cellular material with the axes of the cells disposed substantially perpendicular to the flat skins; and means attaching said flat skins on said sheet of cellular material to form a fluid tight seal for each of the cellular areas formed by the sheet of cellular material; some of said sandwich members being filled with an oxidant filler and other of said sandwich members being filled with a fuel filler.

2. In a rocket grain structure according to claim 1 and wherein said oxidant and fuel fillers are completely formed of substantially non-compressible material.

3. A rocket grain structure comprising: a plurality of individual structurally integral sandwich components; each sandwich component comprising a cellular honeycomb core section and first and second skin coverings bonded to opposite open cell faces of said core forming a substantially fluid-tight seal for the cellular areas within said core section and with the cell axes of the core disposed perpendicular to the skin coverings; a propellant occupying the cellular areas of said honeycomb core section; said plurality of individual sandwich components juxtaposed in contacting relationship to one another and rigidly bonded to one another defining a composite structurally integrated grain structure.

References Cited in the file of this patent

UNITED STATES PATENTS

| | | |
|---|---|---|
| 2,408,252 | De Ganahl | Sept. 24, 1946 |
| 2,484,355 | Parsons | Oct. 11, 1949 |
| 2,488,154 | Africano | Nov. 15, 1949 |
| 2,628,561 | Sage et al. | Feb. 17, 1953 |
| 2,759,418 | Ross et al. | Aug. 21, 1956 |
| 2,802,332 | Orsino | Aug. 13, 1957 |
| 2,813,487 | Miller et al. | Nov. 19, 1957 |
| 2,939,275 | Loedding | June 7, 1960 |
| 2,977,885 | Perry et al. | Apr. 4, 1961 |
| 3,017,743 | Adelman | Jan. 23, 1962 |
| 3,022,735 | Eberle | Feb. 27, 1962 |